Patented Nov. 21, 1950

2,531,354

UNITED STATES PATENT OFFICE 2,531,354

INSECTICIDAL COMPOSITION COMPRISING HEAT - TREATED HEXAETHYL TETRAPHOSPHATE

Michael N. Dvornikoff, St. Louis, Mo., assignor to Monsanto Chemical Company, St. Louis, Mo., a corporation of Delaware No Drawing. Application February 28, 1947, Serial No. 731,702

9 Claims. (Cl. 260—461)

1

This invention relates to insecticidal compositions and particularly to certain novel products derived from hexaethyl tetraphosphate or products having a composition equivalent to said hexaethyl tetraphosphate and having improved properties as insect toxicants and to insecticidal compositions containing the same.

The preparation of the so-called esters of tetraphosphoric acid is described in U. S. Patent 2,336,302 by a method involving the reaction of one mol of phosphorus oxytrihalide with three mols of a neutral triester of phosphoric acid. By this method, various esters, including the hexaethyl tetraphosphate, may be prepared in good yield. These esters may also be prepared by substituting phosphorus pentoxide for phosphorus oxytrihalide in the aforescribed method, in which case two mols of the neutral triester are employed.

At the present time the structural formulae of the esters of the tetraphosphoric acid have not been precisely established. Unknown also at this time is the exact structural formula of the reaction product produced when three mols of a neutral trialkyl phosphate such as triethyl phosphate is mixed with one mol of phosphorus oxytrihalide and the mixture then heated to 150° C., as described in U. S. Patent 2,336,302. This is also true of the product obtained when two mols of a neutral triester such as triethyl phosphate is reacted with one mol of phosphoric pentoxide, as described in U. S. Patent 2,402,703.

When triethyl phosphate is the trialkyl phosphate employed in the above described reactions, the resulting product is an ethyl ester composition which may be described as having the empirical formula: $C_{12}H_{30}O_{13}P_4$, or as the product prepared by reacting three mols of triethyl phosphate with one mol of $POCl_3$ or as the product prepared by reacting two mols of triethyl phosphate with one mol of $P_2O_5$.

Accordingly, in the present specification and claims the empirical formula: $C_{12}H_{30}O_{13}P_4$, or the term "hexaethyl tetraphosphate" will be used to designate the material produced by reacting three mols of triethyl phosphate with one mol of $POCl_3$ or the material produced by heating two mols of triethyl phosphate with one mol of $P_2O_5$, or by any other equivalent method.

It is also known that the hexaethyl tetraphosphate composition prepared by the method described in the above mentioned Patent No. 2,336,302 possesses insecticidal activity when applied to aphids and other agricultural pests. For application to infested vegetation, the composition may be dispersed in water either alone or with a suitable wetting agent.

One of the objects of the present invention is to provide certain novel compositions derived from $C_{12}H_{30}O_{13}P_4$, said compositions having greatly improved properties as insect toxicants.

Another object is to provide an improved insect toxicant derived from a product corresponding to the formula: $C_{12}H_{30}O_{13}P_4$.

A further object is to provide an insecticidal composition having as an active toxicant an improved insect toxicant derived from hexaethyl tetraphosphate.

Other objects will become apparent from the following description and examples:

According to the present invention, generally stated, certain novel compounds or compositions having improved properties as insect and mite toxicants are provided by heating hexaethyl tetraphosphate for a period of time ranging from 2-10 hours, and desirably 2-5 hours, at a temperature in the range of 145° C. to 180° C. and desirably in the range of 145° C. to 160° C. During the heating operation, the hexaethyl tetraphosphate evolves ethylene to the extent of approximately one-half to one and one-half mols, and in most instances, one-half to one mol, per mol of hexaethyl tetraphosphate. The product exhibits an increase in specific gravity and becomes more viscous than hexaethyl tetraphosphate. There is also a tendency for the product to become less soluble in xylene than hexaethyl tetraphosphate. The product of the aforescribed pyrolytic reaction is apparently a mixture of pyrolytic reaction products, the exact nature and composition of which have not been ascertained. However, the aforescribed physical properties are duplicable from batch to batch and the specific gravity of the product is within range of 1.30 to 1.35, or even somewhat higher. The ethylene evolved may be measured, if desired, by collecting the gas and measuring the volume thereof by any suitable means, for example, in a standard eudiometer. The products of the aforescribed pyrolytic action have been found to exhibit remarkably superior toxicity to various agricultural pests such as insects and mites.

The novel products of the present invention may be derived from hexaethyl tetraphosphate prepared either by the reaction of triethyl phosphate and phosphorus oxychloride or by the reaction of triethyl phosphate and phosphorus pentoxide or by any other desired method.

The novel products of the present invention may be formulated in any desired manner to provide insecticidal compositions suitable for application to vegetation. For example, the products may be formulated in an emulsion or may be mixed with any finely divided carrier such as powdered sulfur, talc, pyrophyllite, bentonite, wood flour, starch or carbon black and the resulting composition may then be used as an insecticidal dust in the usual manner. The novel products of the present invention may also be dispersed in water either alone or with a suitable wetting agent such sa sodium dodecylbenzene sulfonate. The resulting compositions may be applied in the usual manner to insect and mite infested vegetation. When the novel products of the present invention are employed in combination with carriers such as dust or liquids, they maintain their initial high activity over a very high range of dilution and may also be used without substantial injury to the host plant.

The following examples will serve to illustrate the novel products and compositions of the present invention. These examples are merely illustrative of the invention and are not to be construed as limiting the invention except as defined in the appended claims.

Example 1

Hexaethyl tetraphosphate is first prepared by heating to 130° C. three mols of tetraethyl phosphate and slowly adding thereto one mol of phosphorus oxychloride over a period of time, for example, two and one-half hours. After the phosphorus oxychloride has all been added, the temperature of the reaction mixture is raised to 150° C. and maintained at that point for approximately half an hour. The product of this reaction is found to be hexaethyl tetraphosphate and to correspond to the formula, $C_{12}H_{30}O_{13}P_4$. This product is completely soluble in xylene and has a specific gravity of approximately 1.29. The hexaethyl tetraphosphate thus prepared is then subjected to a temperature of 145° C. to 150° C. for approximately three hours, whereupon ethylene is evolved and a product is obtained which has a specific gravity at 25° C. in the range of 1.30 to 1.35. The solubility of the product in xylene ranges from slightly soluble to insoluble. The product is considerably more viscous than hexaethyl tetraphosphate. During the heating operation, ethylene is liberated to the extent of approximately one-half to one mol.

The novel pyrolysis products of the present invention may be prepared from hexaethyl tetraphosphate equally as well by extending for an additional 2–10 hours, at a temperature in the range of 145° C. to 180° C., the half-hour heating period after the reactants have combined, without first isolating the hexaethyl tetraphosphate from the reaction mixture.

Example 2

Portions of the product obtained by the process of Example 1 were dispersed in water at varying dilutions and were tested against aphids by spraying the solution upon the leaves of eggplants infested with aphids of the *Myzus porosus* in various stages from live aphids to larvae. The percentage kill of live aphids was found to be as follows:

| Dilution | 1/5000 | 1/8000 | 1/10,000 | 1/12,000 |
| --- | --- | --- | --- | --- |
| Per cent Kill | 97.7 | 98.0 | 90.7 | 93.5 |

Example 3

Respective portions of hexaethyl tetraphosphate, prepared by heating at 100° C. for one to two hours, two mols of triethyl phosphate, and one mol of phosphorus pentoxide were heated at a temperature in the range of 150° C. to 180° C. for periods of time ranging from three hours to 10 hours, during which periods ethylene was evolved. The resulting products were dispersed in water at varying dilutions ranging from 1:1000 to 1:12,000 in the presence of 1% by weight of sodium dodecyl benzene sulfonate. The resulting dispersions were tested against aphids by the procedure of Example 2 and were found to be substantially as effective at the various dilutions as the product of Example 1 in regard to percentage kill of aphids achieved.

Example 4

Hexaethyl tetraphosphate, prepared according to the procedure of Example 1, was heated at a temperature in the range of 145° C. to 160° C. for approximately five hours. Ethylene was evolved and the resulting products were found to have a specific gravity of 1.33. The material was dispersed in water at varying dilutions in the presence of 1% sodium dodecyl benzene sulfonate. The resulting dispersions were tested against *Myzus porosus* on the foliage of rose plants. The percentage kill obtained at various dilutions was as follows:

| Dilution | 1/1000 | 1/2000 | 1/4000 | 1/8000 |
| --- | --- | --- | --- | --- |
| Per cent Kill | 98.3 | 95.9 | 94.9 | 98.0 |

Example 5

Hexaethyl tetraphosphate was prepared according to the method of Example 1 and portions of that material were heated at 145° C. to 160° C. for various periods of time ranging from 2 to 3 hours, and respective portions of the hexaethyl tetraphosphate and of the resulting pyrolytic products were dispersed in water at varying dilutions and the dispersions were tested against aphids on eggplant leaves. The following table shows the results of these tests:

| Product | Time at 145-160° C. | Sp. Gr./25° C. | Per cent Kill of *Myzus porosus* Dilution | |
| --- | --- | --- | --- | --- |
| | | | 1:8,000 | 1:12,000 |
| Hexaethyl tetraphosphate | Hours | 1.29 | 88.9 | 41.1 |
| Product A | 2 | 1.30 | 96.8 | 65.0 |
| Product B | 3 | 1.33 | 98.0 | 93.5 |

Product A was derived by heating hexaethyl tetraphosphate at a temperature of 145° C. to 160° C. for two hours. Product B was obtained by heating hexaethyl tetraphosphate at 145° C. to 160° C. for three hours.

The novel products of the present invention are useful for combating those pests against which nicotine has been used in the past, such as flies, moths, beetles, aphids, plant lice, red spiders, etc. The products of the present invention may be used alone or as substitutes for nicotine or they may be used in combination with nicotine sulfate or other nicotine salts in various proportions and a combination insecticide obtained thereby which has increased effectiveness against insect pests. The present products may also be combined with alpha,alpha-di(p-chlorophenyl)-beta,beta,beta-trichlorethane in various proportions.

Example 6

Hexaethyl tetraphosphate prepared according to the procedure of Example 1 was heated at a temperature in the range of 145° C. to 160° C. and the ethylene evolved was collected and measured under standard conditions in an eudiometer. The heating at the temperature is continued until the ethylene evolved is in the range of one-half to one and one-half mols per mol of hexaethyl tetraphosphate. If desired, the heating operation may be discontinued after the ethylene evolved approximates one-half to one mol per mol of hexaethyl tetraphosphate. The aforescribed process was also repeated using a temperature in the range of 160° C. to 180° C. and the reaction was continued until approximately one and one-half mols of ethylene had been evolved. The resulting products were tested against Myzus porosus on the foliage of eggplants by spraying the leaves with solutions of one part of the product in 2,000 parts of water. The compounds were found very effective in control of the aphids.

I claim:

1. An improved insect toxicant comprising the pyrolysis product of hexaethyl tetraphosphate having a specific gravity in the range of 1.30 to 1.35, a viscosity in excess of that of a hexaethyl tetraphosphate and a solubility in xylene ranging from slightly soluble to insoluble, said product being derived by heating hexaethyl tetraphosphate at a temperature in the range of 145° C. to 160° C. for a period of time in the range of 2–5 hours, ethylene being evolved during said heating period.

2. An improved insect toxicant comprising the pyrolysis product prepared by reacting at a temperature of about 150° C., three mols of triethyl phosphate with one mol of phosphorus oxychloride, whereby three mols of ethyl chloride are evolved, and the product is further heated in the range of 145° C. to 180° C. for a period of time in the range of 2–10 hours, ethylene being evolved during said heating period.

3. An improved insect toxicant comprising the pyrolysis product of hexaethyl tetraphosphate, said pyrolysis product having a specific gravity in the range of 1.30 to 1.35, and being derived by heating hexaethyl tetraphosphate, said hexaethyl tetraphosphate having the empirical formula: $C_{12}H_{30}O_{13}P_4$, to a temperature in the range of 145° C. to 180° C. for a period of time in the range of 2 to 10 hours, ethylene being evolved during said heating period.

4. An insecticidal composition containing as an active ingredient an improved insect toxicant comprising the pyrolysis product of hexaethyl tetraphosphate having a specific gravity in the range of 1.30 to 1.35, a viscosity in excess of that of hexaethyl tetraphosphate and a solubility in xylene ranging from slightly soluble to insoluble, said product being derived by heating hexaethyl tetraphosphate at a temperature in the range of 145° C. to 180° C. for a period of time in the range of 2–10 hours, ethylene being evolved during said heating period.

5. An improved insect toxicant comprising the pyrolysis product of a hexaethyl tetraphosphate, said product having a specific gravity in the range of 1.30 to 1.35, a viscosity in excess of that of hexaethyl tetraphosphate and a solubility in xylene ranging from slightly soluble to insoluble, said product being derived by heating hexaethyl tetraphosphate at a temperature in the range of 145° C. to 180° C. until ethylene is evolved to the extent of approximately one-half to one and one-half mols per mol of hexaethyl tetraphosphate.

6. An improved insect toxicant comprising the pyrolysis product of a hexaethyl tetraphosphate, said product having a specific gravity in the range of 1.30 to 1.35, a viscosity in excess of that of hexaethyl tetraphosphate and a solubility in xylene ranging from slightly soluble to insoluble, said product being derived by heating hexaethyl tetraphosphate at a temperature in the range of 145° C. to 180° C. until ethylene is evolved to the extent of approximately one-helf to one mol per mol of hexaethyl tetraphosphate.

7. An improved insect toxicant comprising the pyrolysis product of a hexaethyl tetraphosphate, said product having a specific gravity in the range of 1.30 to 1.35, a viscosity in excess of that of hexaethyl tetraphosphate and a solubility in xylene ranging from slightly soluble to insoluble, said product being derived by heating hexaethyl tetraphosphate at a temperature in the range of 145° C. to 160° C. until ethylene is evolved to the extent of approximately one-half to one mol per mol of hexaethyl tetraphosphate.

8. A process of preparing an improved insecticide toxicant comprising heating hexaethyl tetraphosphate at a temperature in the range of 145° C. to 180° C. for a period of time in the range of 2–10 hours, ethylene being evolved during said heating period.

9. A process of preparing an improved insect toxicant comprising heating hexaethyl tetraphosphate at a temperature in the range of 145° C. to 180° C. until ethylene is evolved to the extent of approximately one-half to one and one-half mols per mol of hexaethyl tetraphosphate.

MICHAEL N. DVORNIKOFF.

REFERENCES CITED

The following references are of record in the file of this patent:

UNITED STATES PATENTS

| Number | Name | Date |
| --- | --- | --- |
| 1,748,675 | Lommel | Feb. 25, 1930 |
| 2,254,124 | Stevens | Aug. 26, 1941 |
| 2,304,156 | Englemann | Dec. 8, 1942 |
| 2,336,302 | Schrader | Dec. 7, 1943 |
| 2,370,786 | Fox | Mar. 6, 1945 |
| 2,402,703 | Woodstock | June 25, 1946 |
| 2,409,774 | Mask | Oct. 22, 1946 |
| 2,410,118 | Woodstock et al. | Oct. 29, 1946 |

OTHER REFERENCES

Chemical and Engineering News, Sept. 10, 1945, pages 1520, 1521.

Hall, "Insecticides, Insect Repellents, Rodenticides and Fungicides of I. G." Report No. 252, Office of the Publication Board, Department of Commerce, Washington, D. C., issued Jan. 11, 1946, page 10.

Cupples et al., A List of Commercially Available Detergents, Wetting, Dispersing and Emulsifying Agents. Department of Agriculture Publication E504, June 1940, pages 1, 2 and 34.